US005600894A

United States Patent [19]
Blackman et al.

[11] Patent Number: 5,600,894
[45] Date of Patent: Feb. 11, 1997

[54] HOOKING DEVICE FOR A MEASURING TAPE

[75] Inventors: William C. Blackman, Raleigh; Edgar T. Gilliam, Franklinton; William H. Silvester, Cary, all of N.C.

[73] Assignee: Cooper Industries, Houston, Tex.

[21] Appl. No.: 478,759

[22] Filed: Jun. 7, 1995

[51] Int. Cl.⁶ .................................................. G01B 3/10
[52] U.S. Cl. ......................................... 33/758; 33/770
[58] Field of Search ............................. 33/758, 755, 770

[56] References Cited

U.S. PATENT DOCUMENTS

| | | |
|---|---|---|
| 1,623,138 | 4/1927 | Swift . |
| 1,646,826 | 10/1927 | Langsner ................................ 33/758 |
| 1,798,476 | 3/1931 | Langsner ................................ 33/758 |
| 1,860,635 | 5/1932 | Thompson . |
| 2,574,272 | 11/1951 | McCully ................................ 33/770 |
| 3,473,235 | 10/1969 | Quenot . |
| 3,601,896 | 8/1971 | Ledene . |
| 3,611,576 | 10/1971 | Quenot . |
| 3,965,579 | 6/1976 | Woods ................................... 33/758 |
| 4,466,194 | 8/1984 | Rutty . |

FOREIGN PATENT DOCUMENTS

| | | | |
|---|---|---|---|
| 4015958 | 11/1991 | Germany .............................. 33/758 |
| 6-147802 | 5/1994 | Japan .................................... 33/758 |
| 2078960 | 1/1982 | United Kingdom . |

OTHER PUBLICATIONS

Samples of Tape Hooks (No Date).

*Primary Examiner*—Christopher W. Fulton
*Attorney, Agent, or Firm*—Burns, Doane, Swecker & Mathis, L.L.P.

[57] ABSTRACT

A hooking device for a tape measure includes a ring member pivotally attached to a hook member. The hook member includes a planar surface which is perpendicular to the ring member in an extended position. Extending from the planar surface of the hook member are two supporting side surfaces which enhance the rigidity of the hook member to prevent bending. The hook member can also include a plurality of pointed barbs and a contacting surface which prevent slippage of the hooking device during use.

17 Claims, 4 Drawing Sheets

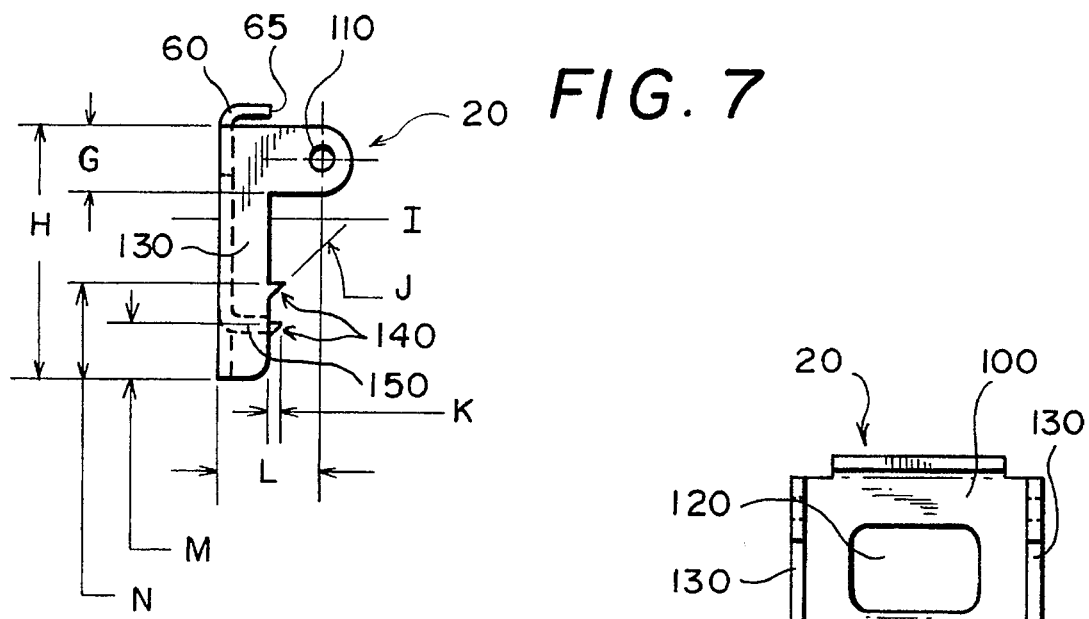
FIG. 7
FIG. 8
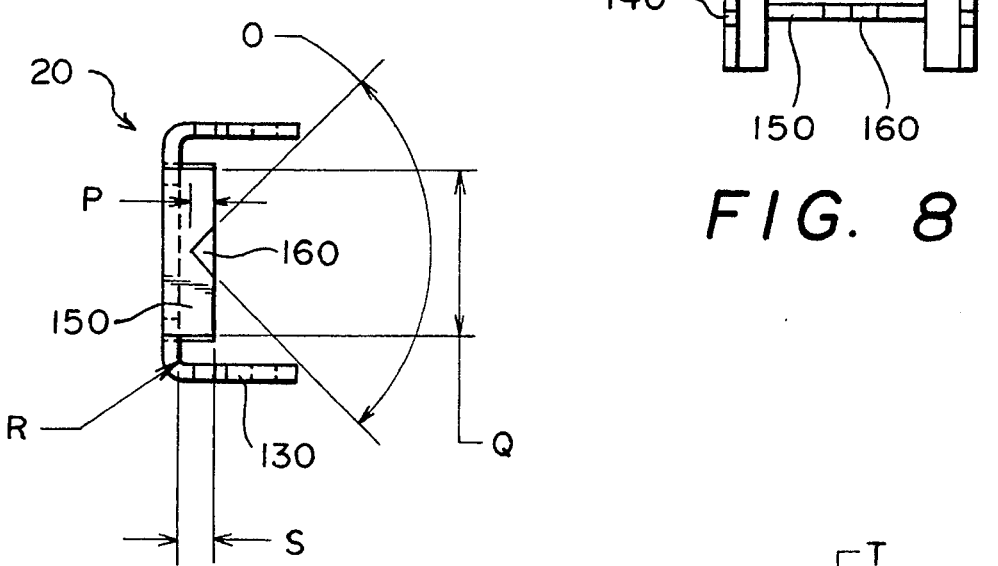
FIG. 9
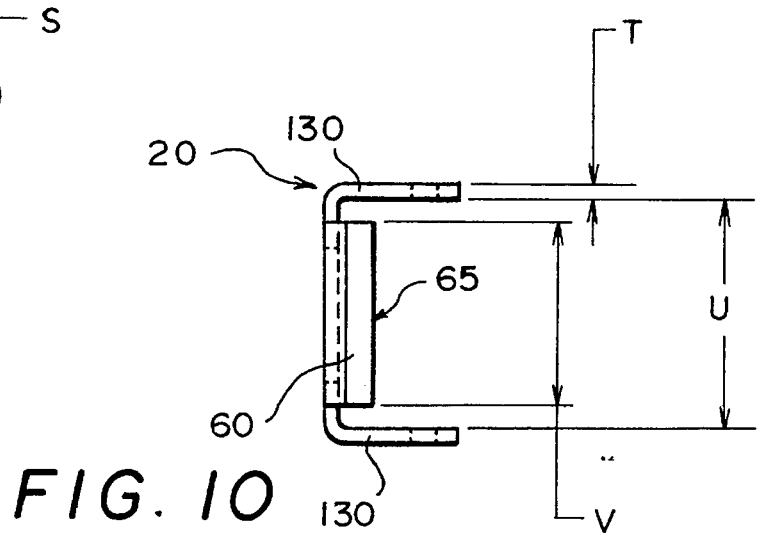
FIG. 10

5,600,894

HOOKING DEVICE FOR A MEASURING TAPE

BACKGROUND

1. Field of the Invention

The present invention relates generally to a retractable hooking device and more particularly to a retractable hooking device for a tape measure which includes a structurally reinforced hook member.

2. Description of the Related Art

It is well known in the art of tape measures to provide an attachment mechanism at one end of the tape to allow a user to temporarily secure the tape end to an article to be measured. Various designs have been proposed which include a ring member attached to the tape and a hook member attached to the ring member which hooks onto the article while the user reads the measurement from a location remote from the end of the tape.

It is also known to construct the ring and hook members so that they are pivotally attached to one another so as to allow the hook member to rotate relative to the ring member. In this way, the hook member in an extended position forms a 90 degree angle with the ring member during use which roughly aligns the ring member with the edge of the article. The hook member can also be rotatably retracted such that it is parallel to and adjacent to the ring member to allow another user to position the end of the tape against an abutting surface without interference from the hook member.

Prior hooking devices, however, have generally employed a hook member which is susceptible to failure due to its thin, flat structure. U.S. Pat. No. 1,860,635 to Thompson, for example, discloses a tape measure device having a pronged hook attached to its ring, the hook being formed of a relatively thin metal sheet. Especially as the measurement distance increases, such a hook becomes increasingly susceptible to bending failure because of a concentration of force in the prongs of the hook.

Other hooking devices have suffered drawbacks due to the limited provision of barbs on the hook member which has resulted in unnecessary slippage of the hook member from the article unless a substantial tension is applied to the tape.

In addition, prior hooking devices have often failed to ensure an accurate alignment of the end of the tape with the end of the article to be measured due to the design of the ring and hook members.

SUMMARY

It is an object of the invention, therefore, to provide an improved hooking device for a tape measure which includes a ring member attached to the tape and a hook member attached to the ring member, which hook member has a reinforced structure to substantially reduce the possibility of bending. The hook member can also be provided with strategically placed barbs which provide an improved gripping action on the article to be measured, thus reducing the problem of slippage.

It is a further object of the invention to provide a hooking device having a hook member which includes a tab or positioning surface abutting the ring member for precise alignment of the hook member in the extended position to ensure an accurate measurement.

According to an exemplary embodiment of the invention, the hooking device includes a ring member attached to a measuring tape of the tape measure and a hook member pivotally attached to the ring member, wherein the hook member includes a substantially planar surface and two supporting sides extending perpendicularly from the planar surface.

BRIEF DESCRIPTION OF THE DRAWINGS

The foregoing and other objects, features and advantages of the present invention will be more readily understood upon reading the following detailed description in conjunction with the drawings in which:

FIG. 7 is a side view of the hook member of FIG. 1;

FIG. 8 is an end view of the hook member of FIG. 1;

FIG. 9 is a bottom view of the hook member of FIG. 1;

FIG. 10 is a top view of the hook member of FIG. 1;

DETAILED DESCRIPTION

Figure 1:
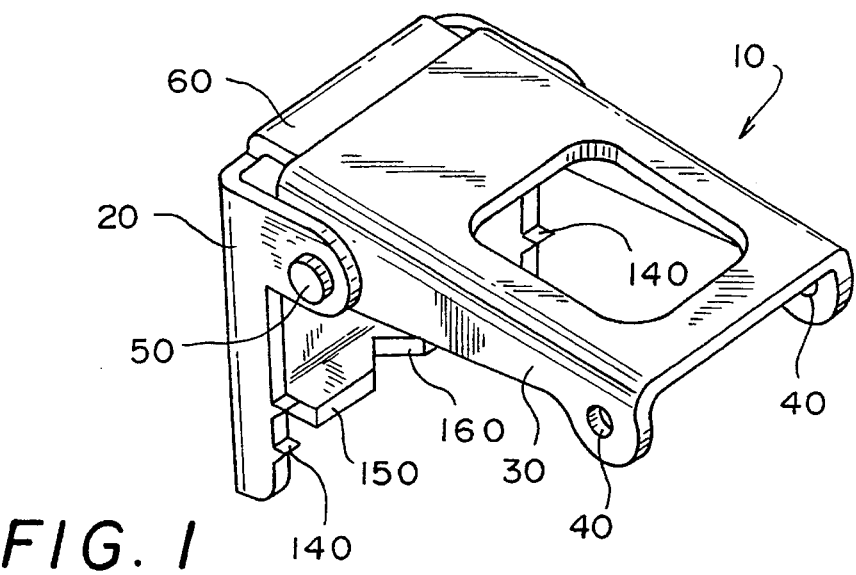
FIG. 1 is a perspective view of a hooking device including a ring member and a hook member according to an exemplary embodiment of the invention.

FIG. 1 shows a perspective view of a hooking device 10 according to an exemplary embodiment of the invention. The hooking device includes a hook member 20 and a ring member 30 both of which can be formed of cold rolled steel and may be plated with nickel or chrome. The ring member 30 of the hooking device 10 is provided with two holes 40 in which an attachment pin can be inserted for attaching the hooking device 10 to the end of a tape measurement tape which loops around the attachment pin.

Figure 2:
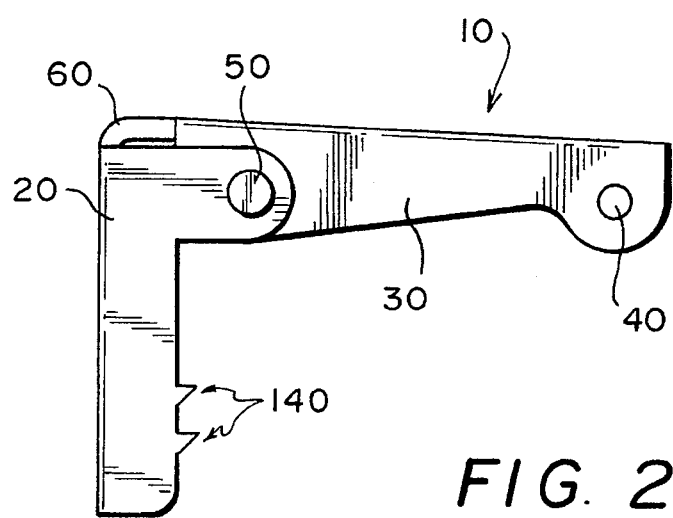
FIG. 2 is a side view of the hooking device of FIG. 1.
Figure 3:
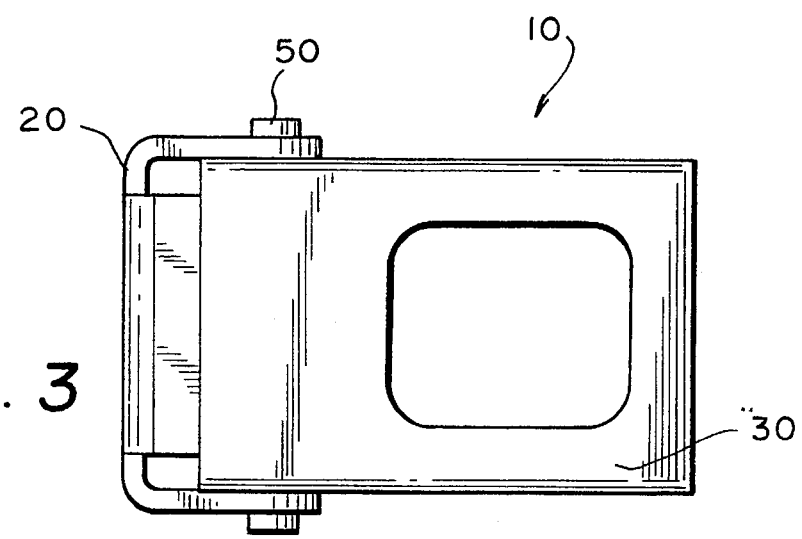
FIG. 3 is a top view of the hooking device of FIG. 1.

As shown in FIGS. 1–3, the hook member 20 is pivotally attached to the ring member 30 with a pin 50. In the extended position, as shown in FIG. 2, the hook member 20 is substantially perpendicular to the ring member 30. In the retracted position (not shown), the hook member 20 is substantially parallel to and adjacent to the ring member 30. The hook member 20 can be designed to include a positioning tab 60 which has and end surface 65 that abuts the ring member 30 in the extended position. The exact angle of alignment between the hook member 20 and the ring member 30 in the extended position can thus be precisely fixed with the end surface 65 of the positioning tab 60 to ensure an accurate measurement due to the precise alignment of the ring member with the edge of the article being measured.

Figure 4:
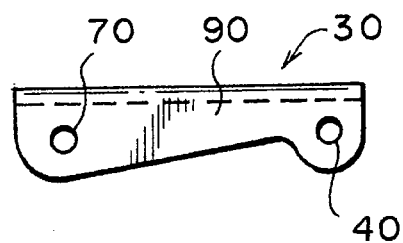
FIG. 4 is a side view of the ring member of FIG. 1.
Figure 5:
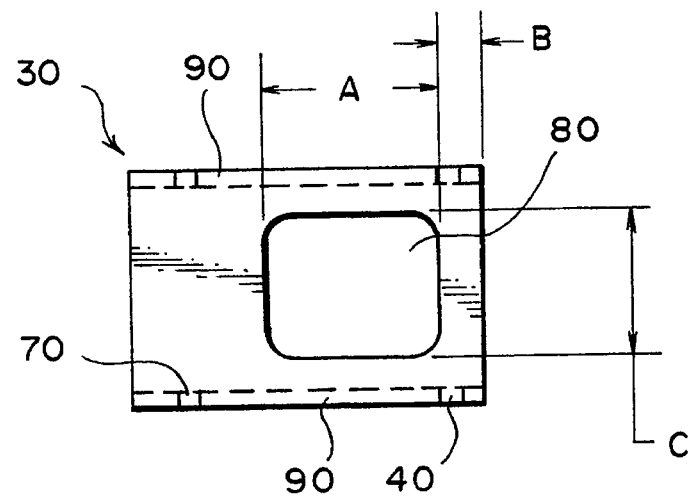
FIG. 5 is a top view of the ring member of FIG. 1.
Figure 6:
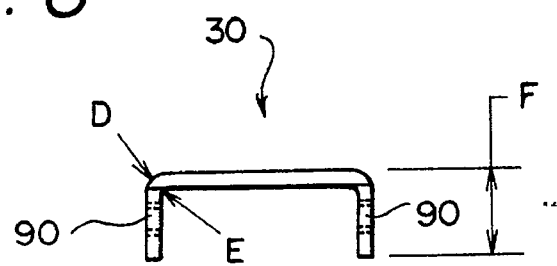
FIG. 6 is an end view of the ring member of FIG. 1.

FIGS. 4–6 show an exemplary ring member 30 from different angles. The ring member 30 includes two sets of holes 40 and 70 to allow attachment of the ring member 30 to the end of the tape and to the hook member 20, respectively. The ring member 30 also includes an opening 80 which can be used, for example, to temporarily secure the hooking device 10 to a nail.

FIG. 6 shows that the ring member 30 includes two side surfaces 90 in which are provided the attachment holes 40 and 70. The side surfaces 90 are formed to enhance the structural rigidity of the ring member 30, as they extend in a substantially perpendicular direction from the planar surface of the ring member. As will be readily appreciated by those of ordinary skill in the art, this configuration offers a significant advantage in the resistance of the ring member 30 to bending during use.

FIGS. 7–10 illustrate an exemplary hook member 20 from various angles. The hook member 20 includes a planar surface 100 which is substantially perpendicular to the ring member 30 in the extended position and substantially parallel to the ring member 30 in the retracted position. The hook member 20 can be attached to the ring member 30 with a pin inserted through two attachment holes 110. The planar surface 100 can include an opening 120 which is aligned with the opening 80 in the ring member 30 in the retracted position to allow the hooking device 10 to be temporarily secured to a nail.

According to a preferred embodiment, the hook member 20 includes two supporting side surfaces 130 which extend from the planar surface 100 in a perpendicular direction, as shown in FIGS. 9 and 10. The supporting side surfaces 130 can be formed, for example, by bending the edges of the planar surface 100. As described with respect to the ring member 30, the supporting side surfaces 130 significantly enhance the resistance to bending of the hook member 20, resulting in a significantly more rigid design. The supporting side surfaces 130 increase the moment of inertia of the cross section shown in FIGS. 9 and 10, which, according to known mechanical principles, is inversely proportional to the deflection of the hook member 20 under an applied load.

The supporting side surfaces 130 are preferably formed along at least a portion of the planar surface 100 sufficient to provide adequate resistance to bending. For example, the supporting side surfaces can extend for ¾, ½, or ⅓ of the distance along the length of the planar surface 100, as well as for the entire distance along the length of the planar surface 100. Those of ordinary skill in the art will thus appreciate that the supporting side surfaces can be adapted, depending on the application of the hooking device 10, to extend for any suitable distance along the length of the planar surface 100.

The supporting side surfaces 130 preferably include a plurality of pointed barbs 140 which are provided to grip the article to be measured. According to one embodiment, at least two barbs 140 are provided on each supporting side surface 130 at a location on the side surface 130 remote from the ring member 30. The barbs 140 are relatively large, which results in enhanced gripping.

The hook member 20 can also include a contacting surface 150, preferably located at a lower end of the hook member 20, for making contact with an edge of the article to be measured. The contacting surface 150 can be formed by bending a portion of the planar surface 100 of the hook member 20 at its lower edge. The contacting surface 150 is formed to extend from the planar surface 100 the same distance as the supporting side surfaces 130, so that together they form a plane which contacts the article. The contacting surface 150 can be aligned adjacent to the barbs 140 of the supporting side surfaces 130 for enhanced gripping action. The contacting surface 150 preferably includes a triangular cut out section 160 as shown in FIGS. 1 and 9.

Figure 11:
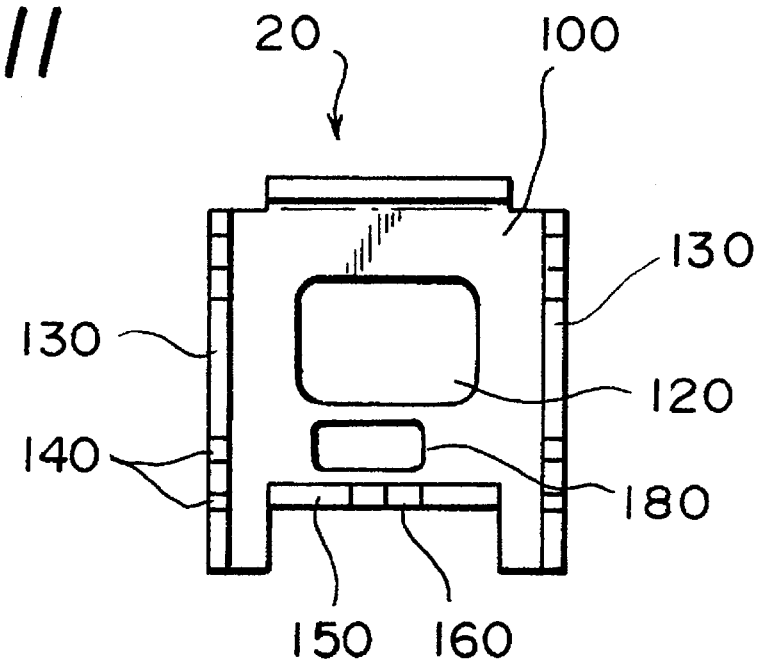
FIG. 11 is an end view of an alternative embodiment of the hook member of FIG. 1.
Figure 12:
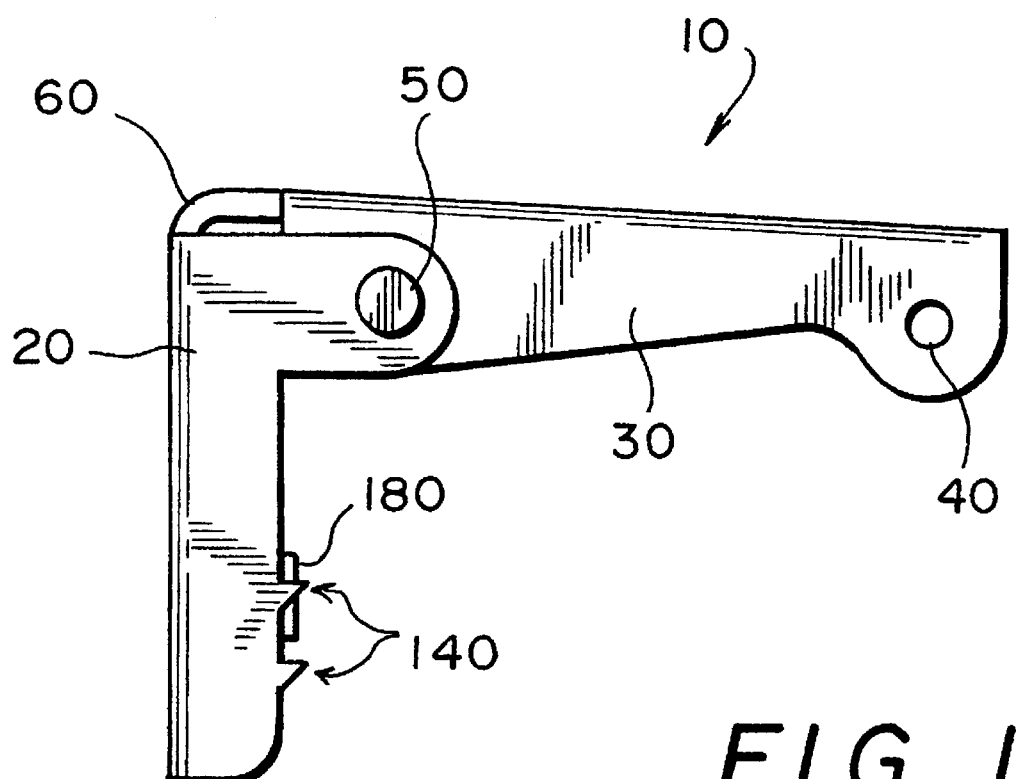
FIG. 12 is a side view of the hooking device of FIG. 11.

The hooking device 10 may also include a pad or bumper 180 mounted on the planar surface 100. See FIGS. 11 and 12. The bumper 180 may be constructed of a soft rubber or elastomeric material that preferably has a high coefficient of friction. The bumper 180 can be constructed so that it protrudes from the planar surface 100 farther than the contacting surface 150, but less than the tips of the barbs 140. Alternatively, the bumper 180 may be used instead of the barbs 140. The bumper 180 may be used to contact and/or grip the edge surface of the article being measured.

The hooking device 10 can be advantageously formed using a progressive die to stamp out the hook member 20 and the ring member 30 from a metal sheet. The invention thus provides a structurally improved hooking device having many advantageous features yet which can be inexpensively manufactured.

As will be appreciated by those of ordinary skill in the art, the principles of the present invention can be utilized in forming an improved hooking device of various dimensions. According to a preferred embodiment of the invention, the following dimensions, as labeled in the drawings are used.

| REFERENCE | DIMENSION |
| --- | --- |
| A | 0.500 inches |
| B | 0.125 inches |
| C | 0.400 inches |
| D | 0.060 inch radius |
| E | 0.020 inch radius |
| F | 0.233 inches |
| G | 0.180 inches |
| H | 0.710 inches |
| I | 0.150 inches |
| J | 45° |
| K | 0.035 inches |
| L | 0.300 inches |
| M | 0.150 inches |
| N | 0.250 inches |
| O | 90° |
| P | 0.075 inches |
| Q | 0.474 inches |
| R | 0.020 inch radius |
| S | 0.110 inches |
| T | 0.040 inches |
| U | 0.644 inches |
| V | 0.500 inches |

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

What is claimed is:

1. A hooking device for a tape measure, comprising:

a ring member for attachment to a measuring tape of the tape measure, the ring member defining a first plane;

a hook member having a substantially planar surface defining a second plane and two supporting sides extending in a substantially perpendicular direction from the planar surface; and means for pivotably connecting the ring member to the hook member, wherein the hook member pivots between a first extended position in which the planar surface of the hook member is substantially perpendicular to the first plane of the ring member, and a second retracted position in which the planar surface of the hook member is substantially parallel to the first plane of the ring member, wherein the hook member further comprises a contacting surface extending from the planar surface for contacting an edge of an article when using said tape measure, the contacting surface having an edge disposed between the supporting sides, the edge of the contacting surface and the edges of the supporting sides being substantially coplanar.

2. The hooking device of claim 1, wherein the hook member further comprises a positioning surface, extending from the planar surface of the hook member, which positioning surface is formed to abut the ring member to align the hook member with the ring member.

3. The hooking device of claim 1, wherein the hook member further comprises at least two barbs extending from each of the supporting sides.

4. The hooking device of claim 3, wherein the barbs are positioned at a location on the supporting sides remote from the ring member when said hook member is in said first extended position.

5. The hooking device of claim 1, wherein the contacting surface includes a triangular cut-out section.

6. The hooking device of claim 1, further comprising a bumper mounted on said planar surface.

7. The hooking device of claim 1, further comprising a first opening in said ring member and a second opening in said hook member, wherein then said hook and said ring are pivoted relative to each other to be substantially parallel said first opening and said second opening are substantially aligned.

8. A hooking device for a tape measure, comprising:

a ring member for attachment to a measuring tape of the tape measure, the ring member defining a first plane;

a hook member having a substantially planar surface defining a second plane and two supporting sides extending in a substantially perpendicular direction from the planar surface; and means for pivotably connecting the ring member to the hook member, wherein the hook member pivots between a first extended position in which the planar surface of the hook member is substantially perpendicular to the first plane of the ring member, and a second retracted position in which the planar surface of the hook member is substantially parallel to the first plane of the ring member, wherein each of said supporting sides extends for substantially an entire length of the hook member planar surface.

9. A hooking device for a measuring tape, comprising:

a ring member for attachment to the measuring tape; and a hook member pivotably attached to the ring member, the hook member including:

a substantially planar surface;

two supporting sides which extend in a substantially perpendicular direction from the planar surface;

at least two barbs disposed on an end of each supporting side remote from the ring member;

a contacting surface, extending from the planar surface, the contacting surface having an edge that is coplanar with edges of the supporting sides; and a positioning tab, extending from the planar surface, which positioning tab abuts an end of the ring member in an open position of the hooking device to pivotably align the hook member with ring members;

wherein the supporting sides extend at least between the at least two barbs and a point where the planar surface attaches to the hook member.

10. The hooking device of claim 9, wherein the ring member defines a first plane;

the planar surface of the hook member defines a second plane; and the hook member rotates relative to the ring member between the open position in which the first plane is substantially perpendicular to the second plane, and a closed position in which the first plane is substantially parallel to the second plane.

11. The hooking device of claim 9, further comprising a bumper mounted on said planar surface.

12. The hooking device of claim 8, further comprising a first opening in said ring member and a second opening in said hook member, wherein when said hook and said ring are pivoted relative to each other to be substantially parallel said first opening and said second opening are substantially aligned.

13. A hooking device for a measuring tape, comprising:

a ring member for attachment to the measuring tape; and a hook member pivotably attached to the ring member, the hook member including:

a substantially planar surface;

two supporting sides which extend in a substantially perpendicular direction from the planar surface;

at least two barbs disposed on an end of each supporting side remote from the ring member;

a contacting surface, extending from the planar surface, the contacting surface having an edge that is coplanar with edges of the supporting sides; and a positioning tab, extending from the planar surface, which positioning tab abuts an end of the ring member in an open position of the hooking device to pivotably align the hook member with the ring member, wherein each said supporting sides extends for substantially an entire length of the hook member planar surface.

14. A hooking device for a measuring tape comprising:

a ring member for attachment to the measuring tape; and a hook member pivotably attached to the ring member at an attachment point, the hook member including:

a substantially planar surface having two lateral edges;

said lateral edges include a 90° bend along substantially an entire length of said planar surface so as to provide bending moment support to said planar surface;

a barb disposed on each of said lateral edges and adjacent an end of each supporting side remote from said attachment point, said barbs extending perpendicular to the planar surface.

15. The hooking device of claim 14, further comprising a contacting surface extending from the planar surface, each barb having a base which contains a lateral edge, the contacting surface having an edge lying in substantially the same plane with said barb bases.

16. The hooking device of claim 14, further comprising a positioning tab extending from said planar surface, said positioning tab abutting an end of the ring member when said hook member is in an open position to pivotably align the hook member with the ring member.

17. The hooking device of claim 14, further comprising a first opening in said ring member and a second opening in said hook member, wherein when said hook and said ring are pivoted relative to each other to be substantially parallel said first opening and said second opening are substantially aligned.

* * * * *